United States Patent
Chen et al.

(10) Patent No.: US 11,402,716 B2
(45) Date of Patent: Aug. 2, 2022

(54) VISUAL RANGE ADJUSTMENT COMPONENT AND DRIVING METHOD THEREOF, VISUAL RANGE ADJUSTMENT DEVICE, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Lei Chen, Beijing (CN); Qi Zhang, Beijing (CN); Xuerong Wang, Beijing (CN); Zhiqiang Wang, Beijing (CN); Xin Ma, Beijing (CN); Chuan Sun, Beijing (CN); Qiuli Wang, Beijing (CN); Bochao Rui, Beijing (CN); Lingyun Shi, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 227 days.

(21) Appl. No.: 16/634,664

(22) PCT Filed: Dec. 7, 2018

(86) PCT No.: PCT/CN2018/119763
§ 371 (c)(1),
(2) Date: Jan. 28, 2020

(87) PCT Pub. No.: WO2020/113556
PCT Pub. Date: Jun. 11, 2020

(65) Prior Publication Data
US 2021/0215987 A1    Jul. 15, 2021

(51) Int. Cl.
*G02F 1/155* (2006.01)
*G02F 1/1524* (2019.01)
*G02F 1/163* (2006.01)

(52) U.S. Cl.
CPC ............ *G02F 1/155* (2013.01); *G02F 1/1524* (2019.01); *G02F 1/163* (2013.01)

(58) Field of Classification Search
CPC ........ G02F 1/155; G02F 1/1524; G02F 1/163; G02F 1/157; G02F 1/153; G02F 1/161; G02F 1/1323; G02F 2201/44
(Continued)

(56) References Cited

U.S. PATENT DOCUMENTS

| 4,348,078 A * | 9/1982 | McIntyre ................ G02F 1/155 |
| | | 359/267 |
| 6,950,220 B2 * | 9/2005 | Abramson ............ G02F 1/1516 |
| | | 359/265 |
| 2012/0038844 A1 | 2/2012 | Choi et al. |
| 2012/0176661 A1 | 7/2012 | Archambeau et al. |

(Continued)

FOREIGN PATENT DOCUMENTS

| CN | 102375263 A | 3/2012 |
| CN | 102612663 A | 7/2012 |

(Continued)

OTHER PUBLICATIONS

International Search Report of PCT/CN2018/119763 in Chinese, dated Sep. 2, 2019, with English translation.
Extended European Search Report in European Application No. 18927229.7 dated Sep. 27, 2021.

*Primary Examiner* — Tuyen Tra
(74) *Attorney, Agent, or Firm* — Collard & Roe, P.C.

(57) ABSTRACT

A visual range adjustment component and a driving method thereof, a visual range adjustment device, and a display device are disclosed. The visual range adjustment compo-
(Continued)

nent includes a first substrate; a second substrate; an electrolyte layer; and a plurality of electrochromic elements. Each of the plurality of electrochromic elements includes a first transparent electrode, two second transparent electrodes and an electrochromic layer; the first transparent electrode is located on a side of the first substrate facing the second substrate and the second transparent electrode is located on a side of the second substrate facing the first substrate; the electrolyte layer is arranged to be in contact with the first transparent electrode, the second transparent electrode, and the electrochromic layer, respectively; the first transparent electrode and the two second transparent electrodes respectively drive the electrochromic layer to change color through the electrolyte layer to adjust a visual range.

16 Claims, 6 Drawing Sheets

(58) Field of Classification Search
USPC .................. 359/237, 238, 240, 245, 265
See application file for complete search history.

(56) References Cited

U.S. PATENT DOCUMENTS

| | | | |
|---|---|---|---|
| 2013/0050798 A1* | 2/2013 | Kim | G02F 1/1323 359/275 |
| 2014/0232960 A1* | 8/2014 | Schwartz | B32B 27/06 349/12 |
| 2016/0011441 A1* | 1/2016 | Schwartz | G02F 1/161 359/275 |
| 2018/0120662 A1* | 5/2018 | Chen | G02F 1/13439 |
| 2019/0049808 A1 | 2/2019 | Satoh et al. | |

FOREIGN PATENT DOCUMENTS

| | | |
|---|---|---|
| CN | 104808413 A | 7/2015 |
| CN | 106950740 A | 7/2017 |
| CN | 108604034 A | 9/2018 |
| CN | 108681171 A | 10/2018 |
| JP | 2018-132718 A | 8/2018 |
| KR | 10-2015-0061757 A | 6/2015 |

* cited by examiner

VISUAL RANGE ADJUSTMENT COMPONENT AND DRIVING METHOD THEREOF, VISUAL RANGE ADJUSTMENT DEVICE, AND DISPLAY DEVICE

CROSS REFERENCE TO RELATED APPLICATIONS

This application is the National Stage of PCT/CN2018/119763 filed on Dec. 7, 2018, the disclosure of which is incorporated by reference.

TECHNICAL FIELD

Embodiments of the disclosure relate to a visual range adjustment component and a driving method thereof, a visual range adjustment device, and a display device.

BACKGROUND

With the continuous development of the smart phone market, business functions of smart phone are continuously strengthened, and many users perform business activities on smart phone. At the same time, the problem of information stealing and peeking on smart phone has gradually attracted people's attentions.

At present, in order to solve the above-mentioned problem of information stealing and peeking on the smart phone, a visual range of a screen of the smart phone can be reduced by additionally providing an anti-peeking film on the screen, so that only the user exactly opposite to the screen of the smart phone can see the contents on the screen, while other people at two lateral sides of the user cannot see the contents on the screen, thus realizing the anti-peeking effect.

SUMMARY

At least one embodiment of the present disclosure provides a visual range adjustment component, which includes: a first substrate; a second substrate arranged opposite to the first substrate; an electrolyte layer located between the first substrate and the second substrate; and a plurality of electrochromic elements located between the first substrate and the second substrate, each of the plurality of electrochromic elements includes a first transparent electrode, two second transparent electrodes and an electrochromic layer; the first transparent electrode is located on a side of the first substrate facing the second substrate, and the second transparent electrode is located on a side of the second substrate facing the first substrate; the electrolyte layer is arranged to be in contact with the first transparent electrode, the second transparent electrode, and the electrochromic layer, respectively; the first transparent electrode and the two second transparent electrodes respectively drive the electrochromic layer to change color through the electrolyte layer to adjust a visual range.

For example, in the visual range adjustment component provided by an embodiment of the present disclosure, each of the plurality of electrochromic elements further includes: a transparent support structure located between the first substrate and the second substrate to maintain a gap between the first substrate and the second substrate; the transparent support structure is arranged between the two second transparent electrodes, an orthographic projection of the transparent support structure on the first substrate is located within an orthographic projection of the first transparent electrode on the first substrate, and the electrochromic layer is located between the transparent support structure and the electrolyte layer.

For example, in the visual range adjustment component provided by an embodiment of the present disclosure, the electrochromic layer is located on a lateral surface of the transparent support structure being in contact with an electrolyte in the electrolyte layer, the first transparent electrode is connected with the electrochromic layer, and the second transparent electrode is spaced apart from the electrochromic layer.

For example, in the visual range adjustment component provided by an embodiment of the present disclosure, two adjacent ones of the plurality of electrochromic elements share one second transparent electrode.

For example, in the visual range adjustment component provided by an embodiment of the present disclosure, the electrochromic layer includes a metal oxide.

For example, in the visual range adjustment component provided by an embodiment of the present disclosure, a material of the electrochromic layer includes at least one selected from the group consisting of tungsten trioxide, tantalum pentoxide, cuprous oxide, nickel oxide, and nickel hydroxide.

For example, in the visual range adjustment component provided by an embodiment of the present disclosure, the electrochromic layer is arranged obliquely with respect to the first substrate.

For example, in the visual range adjustment component provided by an embodiment of the present disclosure, the transparent support structure has an elongated shape extending in a first direction parallel to the first substrate or the second substrate, and a shape of a cross section of the transparent support structure perpendicular to the first direction includes a trapezoid.

For example, in the visual range adjustment component provided by an embodiment of the present disclosure, a range of a base angle of the trapezoid is 65 degrees-75 degrees.

For example, in the visual range adjustment component provided by an embodiment of the present disclosure, the electrochromic layer is located on a lateral surface of the transparent support structure parallel to the first direction.

For example, in the visual range adjustment component provided by an embodiment of the present disclosure, the plurality of electrochromic elements are arranged at intervals along a second direction perpendicular to the first direction.

For example, in the visual range adjustment component provided by an embodiment of the present disclosure, a bottom edge of the trapezoid is an edge of the trapezoid close to the first substrate, and a top edge of the trapezoid is an edge of the trapezoid away from the first substrate.

For example, in the visual range adjustment component provided by an embodiment of the present disclosure, a range of a thickness of the electrolyte layer in a direction perpendicular to the first substrate or the second substrate is 100 μm-200 μm.

At least one embodiment of the present disclosure further provides a visual range adjustment device, including: any one of the abovementioned visual range adjustment components; and a driving component, electrically connected with the first transparent electrode and the second transparent electrode, respectively, and configured to drive the electrochromic layer to switch between a transparent state and an opaque state.

At least one embodiment of the present disclosure further provides a display device, including: any one of the abovementioned visual range adjustment components; and a display panel, having a display side, the visual range adjustment component is located on the display side of the display panel.

At least one embodiment of the present disclosure further provides a driving method of a visual range adjustment component, wherein the visual range adjustment component is any one of the abovementioned visual range adjustment components, and the driving method including: applying a first voltage between the first transparent electrode and the second transparent electrode such that the electrochromic layer is in a transparent state; removing the first voltage, and maintaining the electrochromic layer in the transparent state; applying a second voltage between the first transparent electrode and the second transparent electrode such that the electrochromic layer is in an opaque state; and removing the second voltage, and maintaining the electrochromic layer in the opaque state.

For example, in the driving method of the visual range adjustment device provided by an embodiment of the present disclosure, a light transmittance in the transparent state is in the range of 85%-90%.

For example, in the driving method of the visual range adjustment device provided by an embodiment of the present disclosure, a light transmittance in the opaque state is in the range of 5%-10%.

BRIEF DESCRIPTION OF THE DRAWINGS

In order to clearly explain the technical solution in the embodiments of the present disclosure, the drawings of the embodiments will be briefly introduced in the following. Apparently, the described drawings in the following are only some embodiments of the present disclosure without any limitation to the present disclosure.

DETAILED DESCRIPTION

Figure 1:
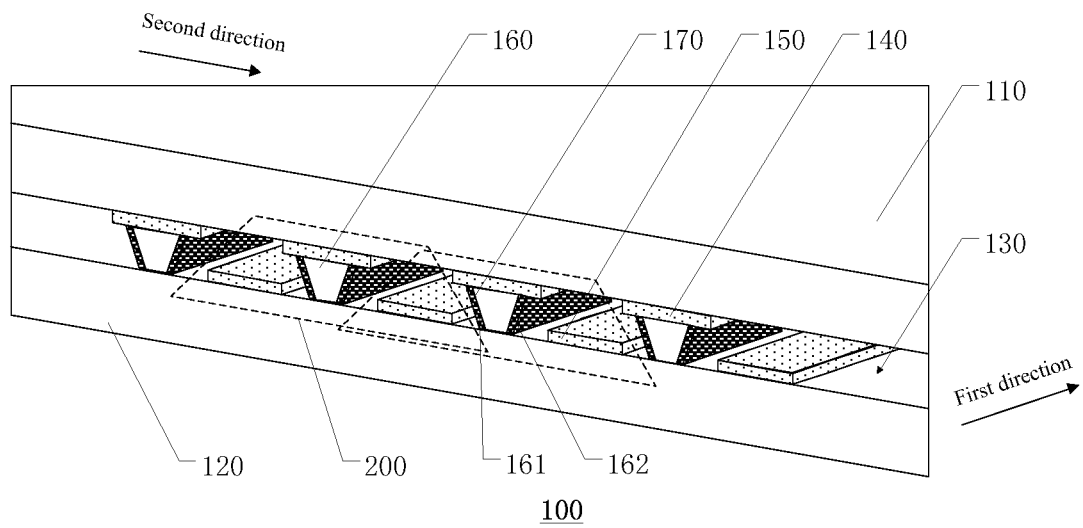
FIG. 1 is a schematic diagram of a visual range adjustment component according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise", "comprising", "include", "including", etc., are intended to specify that the elements or the objects stated before these terms encompass the elements or the objects and equivalents thereof listed after these terms, but do not preclude the other elements or objects. The phrases "connect", "connected" and the like are not limited to a physical or mechanical connection, but also include an electrical connection, either directly or indirectly.

Although an anti-peeking effect can be achieved by additionally providing an anti-peeking film on a screen of smart phone to reduce a visual range of the screen, on the one hand, this method will reduce the visual range, on the other hand, this method will also reduce the display brightness, thus reducing the user experience when performing other activities on the smart phone, such as watching movies and playing games. Therefore, in order to take both of anti-peeking effect and good user experience into account, when the user performs privacy-related activities on the smart phone, such as business activities or payment activities, the visual range of the smart phone can be reduced to achieve the anti-peeking effect; when the user performs other activities on the smart phone, the visual range of the smart phone can be restored to a larger state.

Therefore, the embodiments of the present disclosure provide a visual range adjustment component, a driving method thereof, a visual range adjustment device and a display device. The visual range adjustment component includes a first substrate; a second substrate arranged opposite to the first substrate; an electrolyte layer located between the first substrate and the second substrate; and a plurality of electrochromic elements located between the first substrate and the second substrate, each of the plurality of electrochromic elements includes a first transparent electrode, two second transparent electrodes and an electrochromic layer; the first transparent electrode is located on a side of the first substrate facing the second substrate, and the second transparent electrode is located on a side of the second substrate facing the first substrate; the electrolyte layer is arranged to be in contact with the first transparent electrode, the second transparent electrode, and the electrochromic layer, respectively; the first transparent electrode and the two second transparent electrodes respectively drive the electrochromic layer to change color through the electrolyte layer to adjust a visual range. Upon a driving voltage or current being applied between the first transparent electrode and the second transparent electrode, the electrochromic material in the electrochromic layer being in contact with the electrolyte in the electrolyte layer can undergo a reversible and stable color change, so that the electrochromic layer disposed on the transparent support structures arranged at intervals can be switched between a transparent state and an opaque state, and the visual range can be adjusted.

Hereinafter, the visual range adjustment component and the driving method thereof, the visual range adjustment device, and the display device provided by the embodiments of the present disclosure will be described below with reference to the accompanying drawings.

At least one embodiment of the present disclosure provides a visual range adjustment component. FIG. 1 illustrates a visual range adjustment component according to an embodiment of the present disclosure. As illustrated by FIG. 1, the visual range adjustment component 100 includes a first substrate 110; a second substrate 120 arranged opposite to the first substrate 110; an electrolyte layer 130 located between the first substrate 110 and the second substrate 120; and a plurality of electrochromic elements 200 located between the first substrate 110 and the second substrate 120. Each of the plurality of electrochromic elements 200 includes a first transparent electrode 140, two second transparent electrodes 150 and an electrochromic layer 170; the first transparent electrode 140 is located on a side of the first substrate 110 facing the second substrate 120, and the second transparent electrode 150 is located on a side of the second substrate 120 facing the first substrate 110. The electrolyte layer 130 is arranged to be in contact with the first transparent electrode 140, the second transparent electrode 150 and the electrochromic layer 170, respectively. The first transparent electrode 140 and the two second transparent electrodes 150 respectively drive the electrochromic layer 170 to change color through the electrolyte layer 130 to adjust the visual range.

In the visual range adjustment component provided by the embodiment of the disclosure, upon a driving voltage or current being applied between the first transparent electrode and the second transparent electrode, the electrolyte layer can serve as an ion storage and exchange layer, the second transparent electrode can provide ions and the electrochromic film layer electrically connected with the first transparent electrode can receive ions; or, the electrochromic film layer electrically connected with the first transparent electrode can provide ions and the second transparent electrode receives ions. In this way, the electrochromic material in the electrochromic layer being in contact with the electrolyte in the electrolyte layer can undergo a reversible and stable change in valence state, resulting in a reversible and stable color change, so that the electrochromic layer can be switched between a transparent state and an opaque state. Upon the electrochromic layer being in a transparent state, the electrochromic layer does not block or absorb light emitted from the display panel, and the visual range of the display device including the visual range adjustment component and a display panel is relatively large. Upon the electrochromic layer being in an opaque state, the electrochromic layer blocks and absorbs light emitted from the display panel, and limits a part of the visual range, thereby narrowing the visual range of the display device including the visual range adjustment component and the display panel. Therefore, the visual range adjustment component can adjust the visual range. It should be noted that the visual range in the embodiment of the present disclosure refers to a range of visual angle, and the visual angle refers to an angle at which the user can observe all contents on the display panel from different directions. In addition, the visual angle can be an angle based on the vertical normal of the display panel (i.e. a vertical imaginary line in the middle of the display panel), from which all contents on the display panel can still be observed at a certain angle to the left or right of the vertical normal.

For instance, in some examples, as illustrated by FIG. 1, the electrochromic element 200 further includes a transparent support structure 160 located between the first substrate 110 and the second substrate 120 to maintain a gap between the first substrate 110 and the second substrate 120. The transparent support structure 160 is disposed between the two second transparent electrodes 150, an orthographic projection of the transparent support structure 160 on the first substrate 110 is located within an orthographic projection of the first transparent electrode 140 on the first substrate 110, and the electrochromic layer 170 is located between the transparent support structure 160 and the electrolyte layer 130.

For instance, in some examples, as illustrated by FIG. 1, the electrochromic layer 170 is located on a lateral surface of the transparent support structure 160 being in contact with the electrolyte in the electrolyte layer 130, such as a lateral surface 161 and a lateral surface 162. The first transparent electrode 140 is connected with the electrochromic layer 170, and the second transparent electrode 150 is spaced apart from the electrochromic layer 170, that is, the second transparent electrode 150 is not directly connected with the electrochromic layer 170.

For instance, in some examples, as illustrated by FIG. 1, adjacent ones of the plurality of electrochromic elements 200 share one second transparent electrode 150. For example, in some examples, as illustrated by FIG. 1, the electrochromic layer 170 is on a lateral surface of the transparent support structure 160 parallel to the first direction, such as the lateral surface 161 and the lateral surface 162. That is, the lateral surfaces 161 and 162 are surfaces parallel to the first direction.

For instance, in some examples, the electrochromic layer may include a metal oxide. Because, upon the color of the metal oxide electrochromic material being changed, the current color or light transmittance can be maintained without the need of applying a voltage or current between the first transparent electrode and the second transparent electrode all the time, thereby greatly reducing a power consumption.

For instance, in some examples, the electrochromic layer may include at least one selected from the group consisting of tungsten trioxide, tantalum pentoxide, cuprous oxide material, nickel oxide, and nickel hydroxide.

For instance, in some examples, as illustrated by FIG. 1, a plurality of transparent support structures 160 spaced apart from each other are disposed at intervals in a second direction perpendicular to the first direction. It should be noted that the first direction may be a column direction of the display panel and the second direction may be a row direction of the display device.

For example, the material of the first substrate and the second substrate includes a transparent material, such as glass, quartz, and plastic.

For instance, in some examples, the first substrate and the second substrate include a flexible material, i.e., the first substrate and the second substrate are flexible substrates, so that the visual range adjustment component provided in the present embodiment can be applied to a flexible display panel.

For instance, in some examples, the electrolyte layer may be a lithium perchlorate solution or a lithium perchlorate gel. Of course, embodiments of the present disclosure include but are not limited thereto, and the electrolyte layer may also include other materials.

For instance, in some examples, the electrochromic layer 170 may be coated on the lateral surface of the transparent support structure 160 being in contact with the electrolyte in the electrolyte layer 130, thereby facilitating the formation of a dense and thin electrochromic film.

Figure 2:
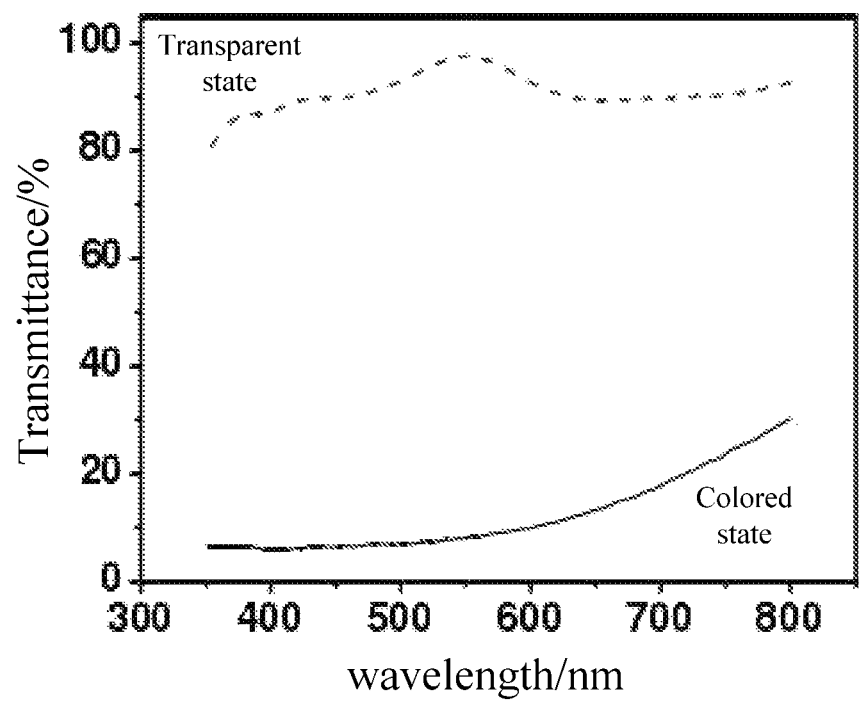
FIG. 2 is a schematic diagram illustrating a transmittance of an electrochromic material according to an embodiment of the present disclosure.

FIG. 2 is a schematic diagram illustrating a transmittance of an electrochromic material according to an embodiment of the present disclosure. As illustrated by FIG. 2, upon different electrical signals being applied to the electrochromic material, the transmittance of the electrochromic material shows different states. FIG. 2 illustrates the nickel metal oxide electrochromic material as an example. Upon the nickel metal oxide electrochromic material being driven by a positive voltage of 0.8 V, that is, a voltage difference between the first transparent electrode and the second transparent electrode is +0.8 V, an average, white light transmittance of the nickel metal oxide electrochromic material ranges from 85% to 90%, and the entire nickel metal oxide electrochromic material is in a transparent state. Upon the nickel metal oxide electrochromic material being driven by a negative voltage of −0.5 V, that is, the voltage difference between the first transparent electrode and the second transparent electrode is −0.5 V, the average, white light transmittance of the nickel metal oxide electrochromic material ranges from 5% to 10%, and the entire nickel metal oxide electrochromic material is in a colored state, that is, an opaque state or an absorption state.

For instance, in some examples, as illustrated by FIG. 1, the electrochromic layer 170 is disposed obliquely with respect to the first substrate 110, so as to have a relatively large light shielding range upon the distance between the first substrate 110 and the second substrate 120 being constant, or to reduce a distance between the first substrate 110 and the second substrate 120 upon the light shielding range being constant.

Figure 3A:
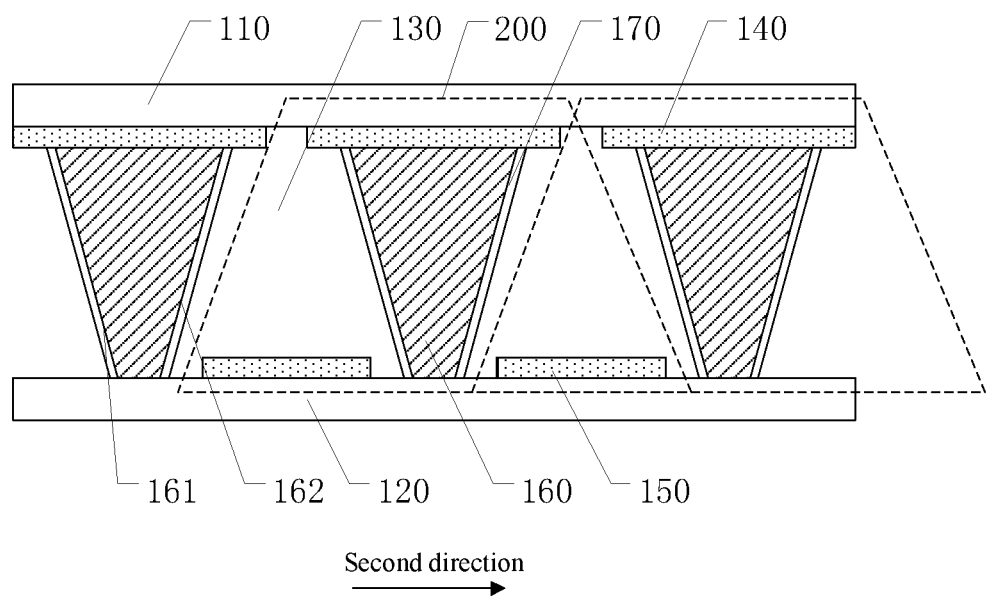
FIG. 3A is a schematic cross-sectional view of a visual range adjustment component taken by a plane perpendicular to a first direction illustrated in FIG. 1, according to an embodiment of the present disclosure.
Figure 3B:
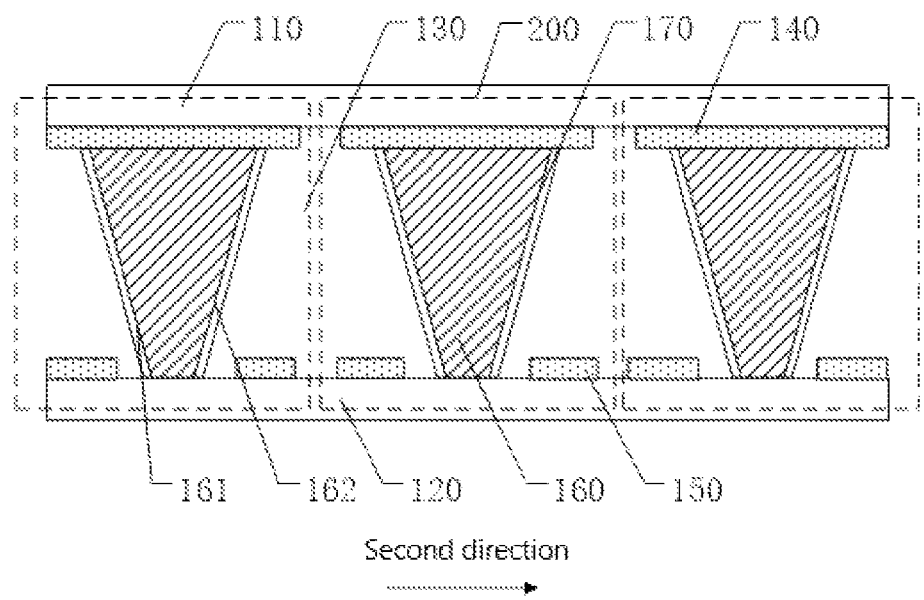
FIG. 3B is a schematic cross-sectional view of another visual range adjustment component taken by a plane perpendicular to the first direction illustrated in FIG. 1, according to an embodiment of the present disclosure.

For instance, in some examples, as illustrated by FIG. 1, the transparent support structure 160 has an elongated shape extending in a first direction parallel to the first substrate 110 or the second substrate 120. FIG. 3A is a schematic cross-sectional view of a visual range adjustment component according to an embodiment of the present disclosure, taken by a plane perpendicular to the first direction illustrated in FIG. 1. FIG. 3B is a schematic cross-sectional view of another visual range adjustment component according to an embodiment of the present disclosure, taken by a plane perpendicular to the first direction illustrated in FIG. 1. As illustrated by FIGS. 3A and 3B, a cross section of the transparent support structure 160 perpendicular to the first direction includes a trapezoidal shape. Thus, the electrochromic layer 170 located on the lateral surface of the transparent support structure 160 being in contact with the electrolyte in the electrolyte layer 130 may have an angle with respect to the first substrate 110. In this case, the electrochromic layer 170 can reduce the distance between the first substrate 110 and the second substrate 120, so as to reduce the thickness of the visual range adjustment component under the precondition that the minimum visual range of the visual range adjustment component (for example, the minimum visual range can be based on the vertical normal of the display panel and be offset by ±20 degrees in the second direction) is unchanged.

For instance, in some examples, the electrolyte layer 130 has a thickness range of 100 μm-200 μm in a direction perpendicular to the first substrate 110 or the second substrate 120. For example, the thickness of the electrolyte layer 130 is 160 μm.

For instance, in some examples, a base angle of the trapezoid is in the range of 65 degrees-75 degrees. For another example, the base angle of the trapezoid is in the range of 68 degrees-70 degrees. In this case, the visual range adjustment component has a relatively small thickness on the premise that the visual range reaches a target (for example, the minimum visual range can be based on the vertical normal of the display panel and be offset by ±20 degrees in the second direction).

For instance, in some examples, as illustrated by FIGS. 3A and 3B, the bottom edge of the trapezoid is an edge of the trapezoid close to the first substrate 110, and the top edge of the trapezoid is an edge of the trapezoid away from the first substrate 110. That is, the cross section of the transparent support structure 160 perpendicular to the first direction has an inverted-trapezoid shape. In the case where the display panel is disposed on a side of the second substrate 120 away from the first substrate 110, the visual range can be better narrowed when the electrochromic layer 170 is in an opaque state.

Figure 4:
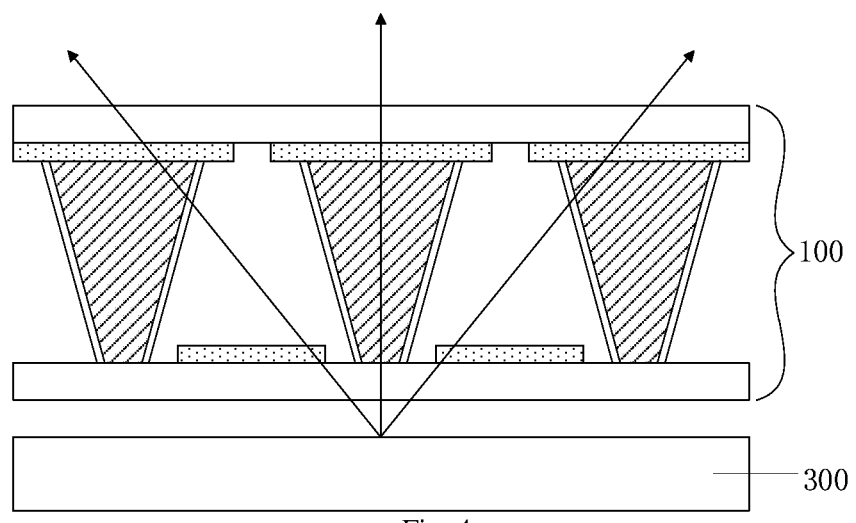
FIG. 4 is an operation diagram of the visual range adjustment component illustrated in FIG. 3A.
Figure 5:
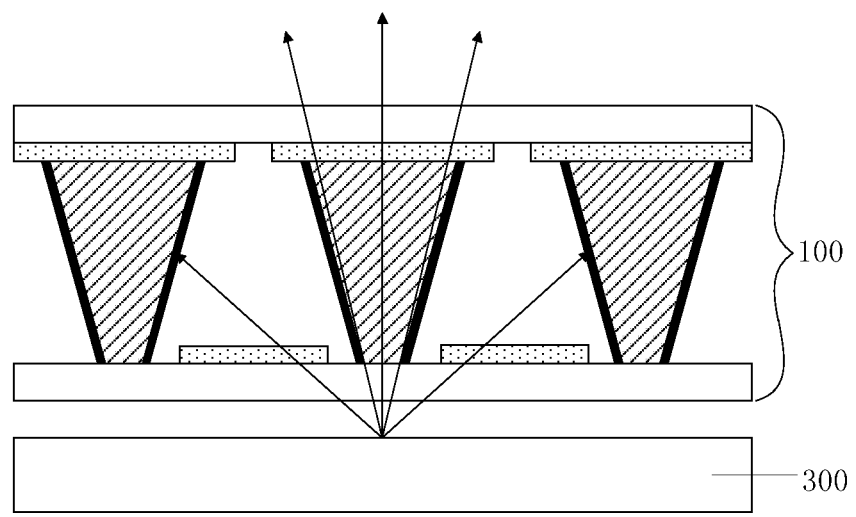
FIG. 5 is another operation diagram of the visual range adjustment component illustrated in FIG. 3A.

For instance, in some examples, as illustrated by FIG. 3A, adjacent ones of the plurality of electrochromic elements 200 share one second transparent electrode 150. Of course, the embodiments of the present disclosure include but are not limited thereto, and adjacent ones of the plurality of electrochromic elements 200 may not share one second transparent electrode 150. FIG. 4 is an operation diagram of the visual range adjustment component illustrated in FIG. 3A; FIG. 5 is another operation diagram of the visual range adjustment component illustrated in FIG. 3A. As illustrated by FIGS. 4 and 5, the visual range adjustment component 100 may be disposed on a display side of a display panel 300 (e.g., a liquid crystal display panel or an organic light emitting diode display panel), thereby realizing adjustment of the visual range of a display device including the visual range adjustment component 100 and the display panel 300.

For example, as illustrated by FIG. 4, upon the electrochromic layer 170 being in a transparent state, for example, the average, white light transmittance of the electrochromic layer 170 ranges from 85% to 90%, the electrochromic layer 170 does not block or absorb the light emitted from the display panel 300, and the light emitted from the display panel 300 basically does not change after passing through the visual range adjustment component 100. In this case, the visual range of the display device including the visual range adjustment component 100 and the display panel 300 is large. Moreover, the brightness of the display device including the visual range adjustment component 100 and the display panel 300 decreases less (e.g., 10%-15%), which can ensure a better user experience.

For example, as illustrated by FIG. 5, upon the electrochromic layer 170 being in an opaque state, for example, the average, white light transmittance of the electrochromic layer 170 ranges from 5% to 10%, and the electrochromic layer 170 shields the light emitted from the display panel 300. As illustrated by FIG. 5, the light emitted from the display panel 300 is divided into two portions, in which the light with large viewing angle is absorbed by the opaque electrochromic layer 170, the light with small viewing angle is not blocked or absorbed by the electrochromic layer and can be normally transmitted, thereby narrowing the visual range of the display device including the visual range adjustment component and the display panel.

Figure 6:
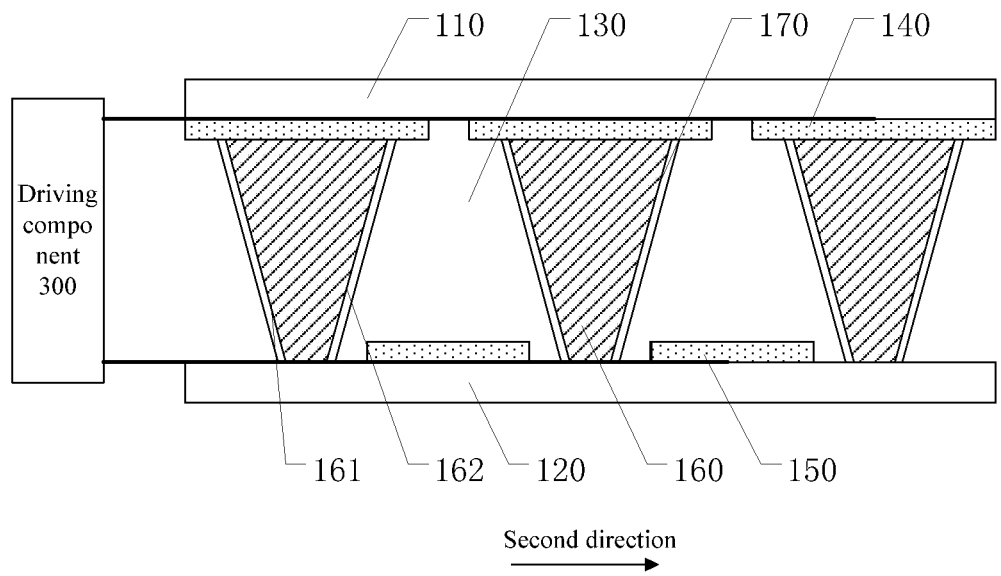
FIG. 6 is a schematic diagram of a visual range adjustment device according to an embodiment of the present disclosure.

An embodiment of the present disclosure also provides a visual range adjustment device. FIG. 6 is a schematic diagram of a visual range adjustment device according to an embodiment of the present disclosure. As illustrated by FIG. 6, the visual range adjustment device 400 includes the visual range adjustment component 100 provided in the above embodiments and a driving component 300 configured to drive the electrochromic layer to switch between a transparent state and an opaque state. The driving component 300 is electrically connected to the first transparent electrode 140 and the second transparent electrode 150, respectively, so as to apply a voltage or current to the first transparent electrode 140 and the second transparent electrode 150 to adjust the visual range. It should be noted that the driving component 300 can be integrated in a driving circuit of the display panel. In this case, the visual range adjustment component 100 needs to be electrically connected with the driving circuit of the display panel.

Figure 7:
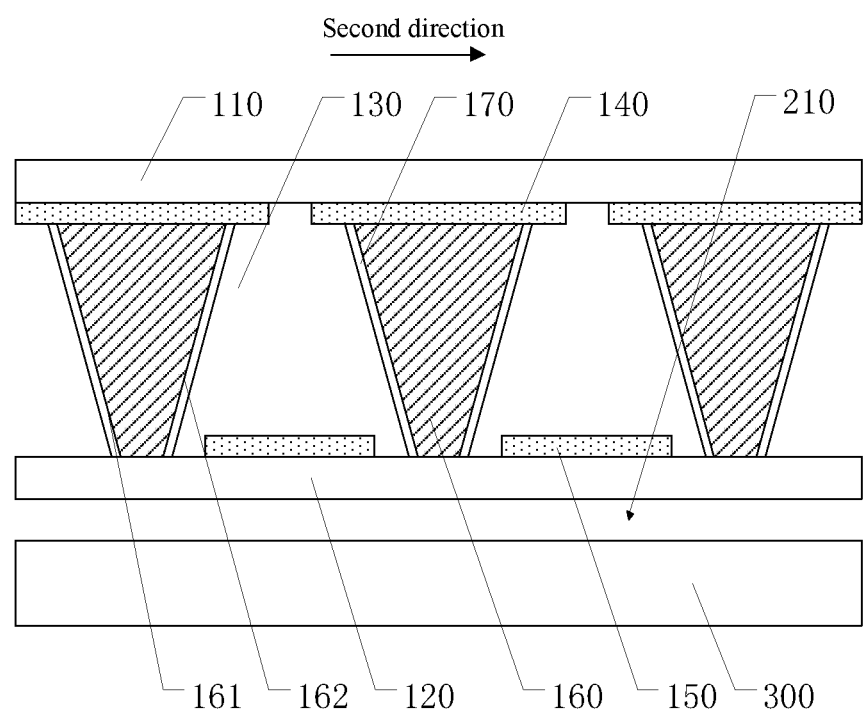
FIG. 7 is a schematic diagram of a display device according to an embodiment of the present disclosure.

An embodiment of the present disclosure also provides a display device. FIG. 7 is a schematic diagram of a display device according to an embodiment of the present disclosure. As illustrated by FIG. 7, the display device 500 includes the visual range adjustment component 100 provided in the above embodiments and the display panel 300. The display panel 300 has a display side 210, and the visual range adjustment component 100 is located on the display side 210 of the display panel 300 so as to adjust the visual range of the display device 500.

In the display device provided by the embodiment of the present disclosure, the electrochromic material in the electrochromic layer of the visual range adjustment component can undergo a reversible and stable change in valence state, resulting in a reversible and stable color change, so that the electrochromic layer disposed on the transparent support structures arranged at intervals can be switched between a transparent state and opaque state. Upon the electrochromic layer being in a transparent state, the electrochromic layer does not block or absorb light emitted from the display panel, and the visual range of the display device including the visual range adjustment component and a display panel is relatively large. Upon the electrochromic layer being in an opaque state, the electrochromic layer blocks and absorbs light emitted from the display panel, and limits a part of the visual range, thereby narrowing the visual range of the display device including the visual range adjustment component and the display panel. Therefore, the visual range of the display device can be adjusted.

Figure 8:
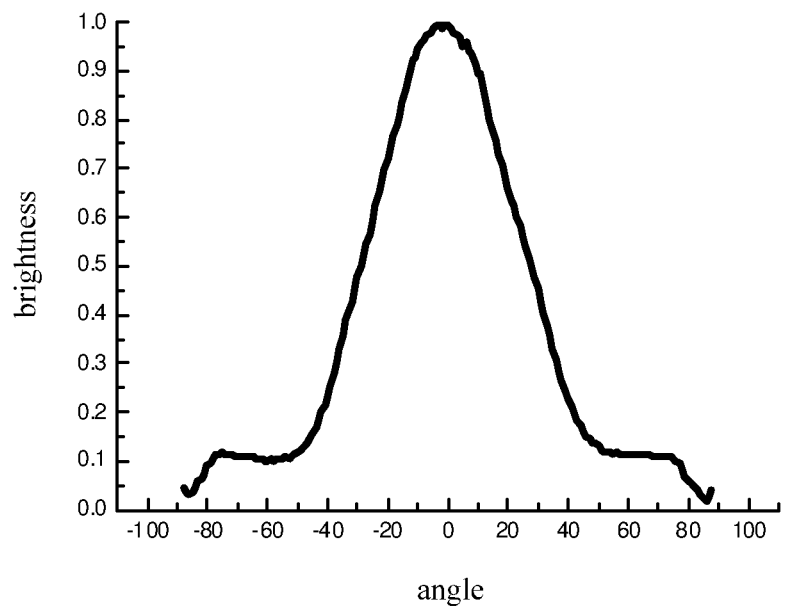
FIG. 8 is a schematic diagram illustrating a distribution of brightness with respect to angle under a wide viewing angle of the display device illustrated in FIG. 7.
Figure 9:
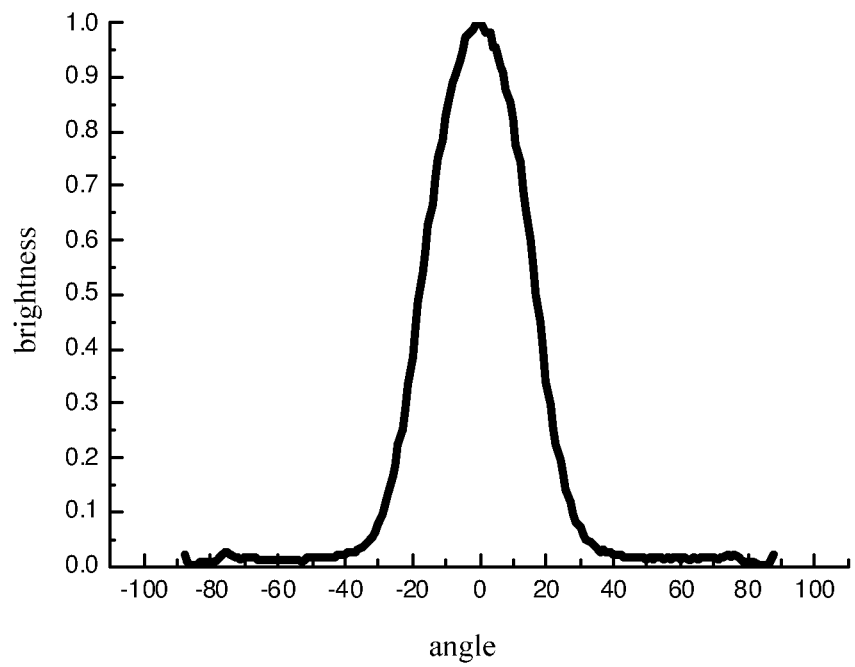
FIG. 9 is a schematic diagram illustrating a distribution of brightness with respect to angle under a narrow viewing angle of the display device illustrated in FIG. 7.

FIG. 8 is a schematic diagram illustrating a distribution of brightness with respect to angle under a wide viewing angle of the display device illustrated in FIG. 7; FIG. 9 is a schematic diagram illustrating a distribution of brightness with respect to angle under a narrow viewing angle of the display device illustrated in FIG. 7. As illustrated by FIGS. 8 and 9, the visual range of the display device is significantly reduced.

Figure 10:
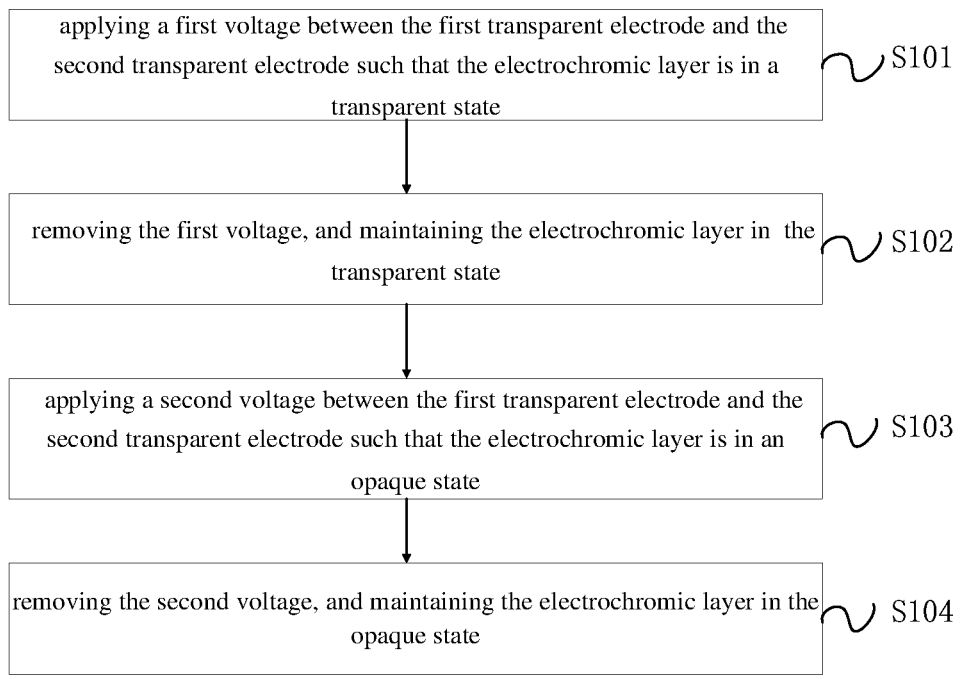
FIG. 10 is a flowchart of a driving method of a visual range adjustment component according to an embodiment of the present disclosure.

An embodiment of the present disclosure also provides a driving method of the visual range adjustment component. FIG. 10 is a flowchart of a driving method of a visual range adjustment component according to an embodiment of the present disclosure. As illustrated by FIG. 10, the driving method includes steps S101-S104.

Step S101: applying a first voltage between the first transparent electrode and the second transparent electrode such that the electrochromic layer is in a transparent state.

For example, in the case where the material of the electrochromic layer is nickel metal oxide, the first voltage may be a positive voltage of 0.8 V, i.e., a voltage difference between the first transparent electrode and the second transparent electrode is +0.8 V.

Step S102: removing the first voltage, and maintaining the electrochromic layer in the transparent state.

Step S103: applying a second voltage between the first transparent electrode and the second transparent electrode such that the electrochromic layer is in an opaque state.

For example, in the case where the material of the electrochromic layer is nickel metal oxide, the second voltage may be a negative voltage of 0.5 V, that is, the voltage difference between the first transparent electrode and the second transparent electrode is −0.5 V.

Step S104: removing the second voltage, and maintaining the electrochromic layer in the opaque state.

The driving method of the visual range adjustment component provided by the present embodiment not only can adjust the visual range but also can maintain the current color or light transmittance without the need of applying the voltage or current between the first transparent electrode and the second transparent electrode all the time because the voltage or current is only required to be applied when changing the state of the electrochromic layer, thus greatly reducing the power consumption.

For instance, in some examples, the light transmittance in the transparent state ranges from 85% to 90%.

For instance, in some examples, the light transmittance in the opaque state ranges from 5% to 10%

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

The foregoing is only specific embodiments of the present disclosure, but the protection scope of the present disclosure is not limited thereto. Any modifications or alternations easily envisaged by one person skilled in the art within the technical scope of the present disclosure should fall within the protection scope of the present disclosure. Therefore, the protection scope of the present disclosure should be based on protection scope of the claims.

What is claimed is:

1. A visual range adjustment component, comprising:
a first substrate;
a second substrate arranged opposite to the first substrate;
an electrolyte layer located between the first substrate and the second substrate; and
a plurality of electrochromic elements located between the first substrate and the second substrate,
wherein each of the plurality of electrochromic elements comprises a first transparent electrode, two second transparent electrodes, and an electrochromic layer; the first transparent electrode is located on a side of the first substrate facing the second substrate, and the second transparent electrode is located on a side of the second substrate facing the first substrate,
the electrolyte layer is arranged to be in contact with the first transparent electrode, the second transparent electrode, and the electrochromic layer, respectively, and
the first transparent electrode and the two second transparent electrodes respectively drive the electrochromic layer to change color through the electrolyte layer to adjust a visual range, wherein each of the plurality of electrochromic elements further comprises:
a transparent support structure, located between the first substrate and the second substrate to maintain a gap between the first substrate and the second substrate,
wherein the transparent support structure is located between the two second transparent electrodes, an orthographic projection of the transparent support structure on the first substrate is located within an orthographic projection of the first transparent electrode on the first substrate, and the electrochromic layer is located between the transparent support structure and the electrolyte layer, and
wherein the transparent support structure has an elongated shape extending in a first direction parallel to the first substrate or the second substrate, and a shape of a cross section of the transparent support structure perpendicular to the first direction comprises a trapezoid.

2. The visual range adjustment component according to claim 1, wherein the electrochromic layer is located on a lateral surface of the transparent support structure being in contact with an electrolyte in the electrolyte layer, the first transparent electrode is connected with the electrochromic layer, and the second transparent electrode is spaced apart from the electrochromic layer.

3. The visual range adjustment component according to claim 1, wherein two adjacent ones of the plurality of electrochromic elements share one second transparent electrode.

4. The visual range adjustment component according to claim 1, wherein the electrochromic layer comprises a metal oxide.

5. The visual range adjustment component according to claim 4, wherein a material of the electrochromic layer comprises at least one selected from the group consisting of tungsten trioxide, tantalum pentoxide, cuprous oxide, nickel oxide, and nickel hydroxide.

6. The visual range adjustment component according to claim 1, wherein the electrochromic layer is arranged obliquely with respect to the first substrate.

7. The visual range adjustment component according to claim 1, wherein a range of a base angle of the trapezoid is 65 degrees-75 degrees.

8. The visual range adjustment component according to claim 1, wherein the electrochromic layer is located on a lateral surface of the transparent support structure parallel to the first direction.

9. The visual range adjustment component according to claim 1, wherein the plurality of electrochromic elements are arranged at intervals along a second direction perpendicular to the first direction.

10. The visual range adjustment component according to claim 1, wherein a bottom edge of the trapezoid is an edge of the trapezoid close to the first substrate, and a top edge of the trapezoid is an edge of the trapezoid away from the first substrate.

11. The visual range adjustment component according to claim 1, wherein a range of a thickness of the electrolyte layer in a direction perpendicular to the first substrate or the second substrate is 100 μm-200 μm.

12. A visual range adjustment device, comprising:
the visual range adjustment component according to claim 1; and
a driving component, electrically connected with the first transparent electrode and the second transparent electrode, respectively, and configured to drive the electrochromic layer to switch between a transparent state and an opaque state.

13. A display device, comprising:
the visual range adjustment component according to claim 1; and
a display panel, having a display side,
wherein the visual range adjustment component is located on the display side of the display panel.

14. A driving method of a visual range adjustment component, wherein the visual range adjustment component is the visual range adjustment component according to claim 1, the driving method comprising:
applying a first voltage between the first transparent electrode and the second transparent electrode such that the electrochromic layer is in a transparent state;
removing the first voltage, and maintaining the electrochromic layer in the transparent state;
applying a second voltage between the first transparent electrode and the second transparent electrode such that the electrochromic layer is in an opaque state; and
removing the second voltage, and maintaining the electrochromic layer in the opaque state.

15. The driving method of the visual range adjustment component according to claim 14, wherein a light transmittance in the transparent state is in the range of 85%-90%.

16. The driving method of the visual range adjustment component according to claim 14, wherein a light transmittance in the opaque state is in the range of 5%-10%.

* * * * *